United States Patent [19]
Eschenbach

[11] Patent Number: 5,820,080
[45] Date of Patent: *Oct. 13, 1998

[54] PRECISION EQUIVALENT LANDING SYSTEM USING GPS AND AN ALTIMETER

[75] Inventor: Ralph F. Eschenbach, Woodside, Calif.

[73] Assignee: Trimble Navigation Limited, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 615,837

[22] Filed: Mar. 14, 1996

[51] Int. Cl.⁶ .................................................. B64C 13/18
[52] U.S. Cl. ..................... 244/183; 340/977; 342/357; 455/53.1; 701/16; 701/213
[58] Field of Search ........................... 244/183–189, 244/194–195; 340/977, 972; 342/397; 455/53.1; 701/16–18, 213–216

[56] References Cited

U.S. PATENT DOCUMENTS

| | | | |
|---|---|---|---|
| 4,326,189 | 4/1982 | Crane | 340/977 |
| 5,136,301 | 8/1992 | Bechtold et al. | 340/977 |
| 5,210,540 | 5/1993 | Masumoto | 342/357 |
| 5,289,185 | 2/1994 | Ramier et al. | 340/972 |
| 5,361,212 | 11/1994 | Class et al. | 244/114 R |
| 5,493,694 | 2/1996 | Vicek et al. | 455/53.1 |
| 5,574,649 | 11/1996 | Levy | 342/357 |

*Primary Examiner*—Galen L. Barefoot
*Attorney, Agent, or Firm*—Wagner, Murabito & Hao

[57] ABSTRACT

A precision equivalent landing system. In one embodiment, a position determining system is coupled to an aircraft. The position determining system generates lateral position information of the aircraft with respect to a landing approach path. An altimeter is also coupled to the aircraft. The altimeter generates vertical position information of the aircraft with respect to the landing approach path. A graphic display disposed within the aircraft concurrently displays a visual representation of the lateral position of the aircraft with respect to the landing approach path and the vertical position of the aircraft with respect to the landing approach path. In so doing, the present invention provides both relative position and altitude of an incoming aircraft with respect to a landing approach path. Thus, the present invention provides a precision equivalent landing system without requiring the equipment and expense associated with ILS or FAA MLS precision landing systems.

17 Claims, 5 Drawing Sheets

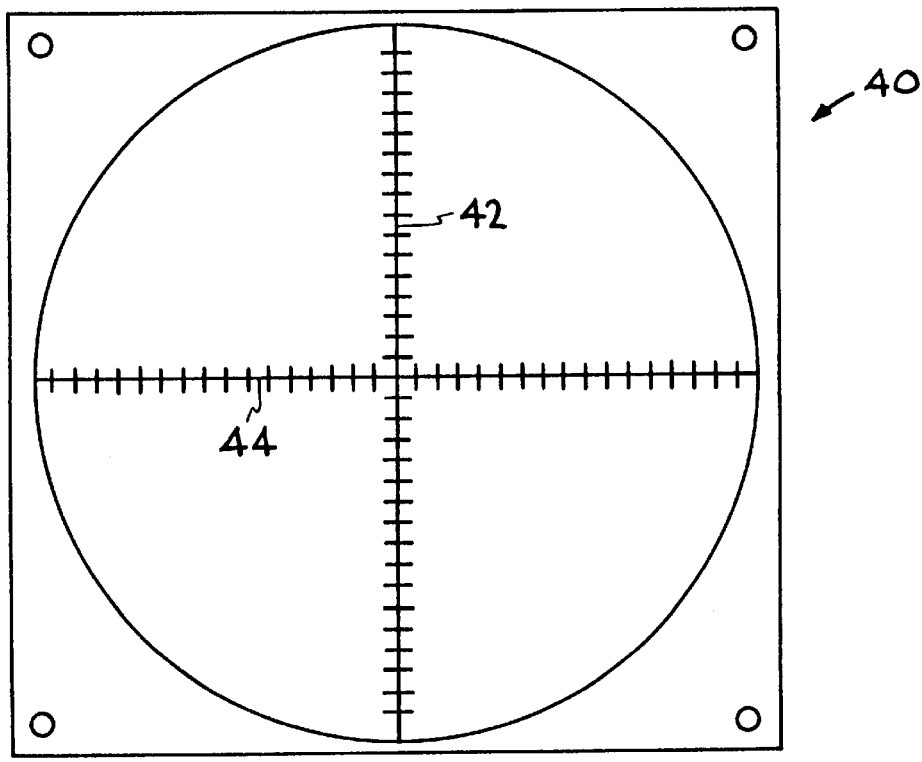
FIG. 3A (PRIOR ART)
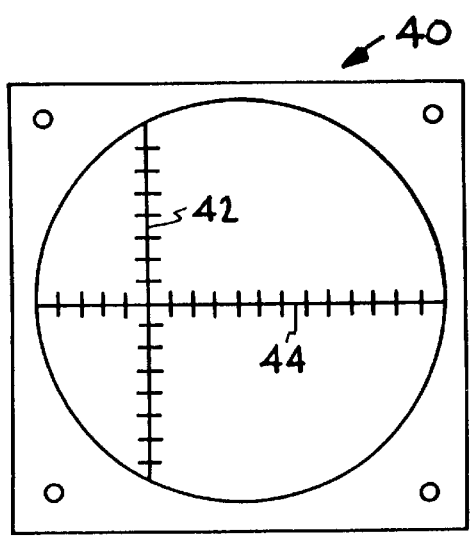 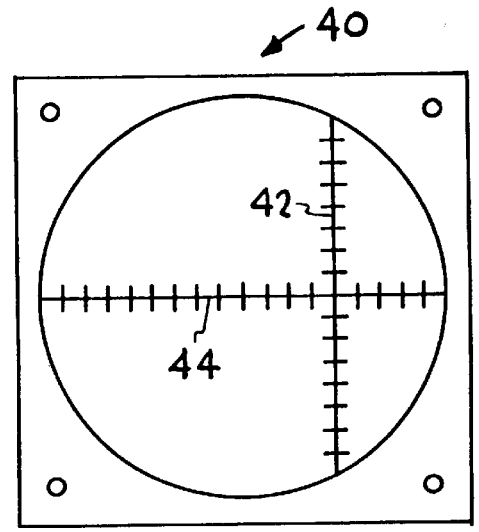
FIG. 3B  FIG. 3C
(PRIOR ART)  (PRIOR ART)

PRECISION EQUIVALENT LANDING SYSTEM USING GPS AND AN ALTIMETER

TECHNICAL FIELD

This invention relates to aircraft landing systems. Specifically, the present invention relates to precision landing systems.

BACKGROUND ART

Two basic types of aircraft landing systems, i.e. non-precision and precision, are well known in the art. A precision landing system provides both horizontal and vertical guidance to the pilot, whereas a non-precision landing system does not directly provide vertical guidance. Prior Art FIG. 1 schematically depicts an aircraft attempting a non-precision landing approach. In a non-precision landing system, a series of VHF omni-range (VOR) or non-directional beacons (NDBs), typically shown as 10 and 12, direct a pilot through a respective series of descent or step down altitudes. More specifically, a pilot maintains a first altitude 14 until the aircraft 16 passes through vertical fan-shaped beams 18 and 20 emanating from, for example, NDBs 10 and 12, respectively. As shown in Prior Art FIG. 1, once aircraft 16 passes through beam 18, the pilot uses an altimeter to descend to a lower specified altitude 22. The pilot maintains aircraft 16 at the specified altitude 22 until NDB 12 is reached. As aircraft 16 approaches the runway 24, the pilot flies aircraft 16 to a specified altitude 26 referred to as the decision height. While flying at the decision height, the pilot attempts to visually ascertain a runway reference such as the runway itself, runway lights, runway threshold, and the like, within an allotted time. If the pilot visually ascertains a runway reference within the allotted time, the pilot lands aircraft 16. If the pilot does not visually ascertain a runway reference within the allotted time, the landing of aircraft 16 is aborted. Although non-precision landing systems are widely used, pilot's often desire a greater degree of guidance when making an approach for landing.

Prior Art FIG. 2 schematically depicts an aircraft attempting a precision landing approach. In a precision landing system, a ground-based transmitter 30 radiates a directional signal 32 from the end of a runway 34. In an ILS-type system the signal is transmitted in paired bands at a frequency in the range of 100 to 300 MHz. In an FAA MLS-type precision landing system, the signal is transmitted over any one of 200 separate frequency channels assigned for use in the 5000 to 5250 MHz range. Typically, each airport employing a precision landing system has a unique signal frequency associated therewith. As shown in Prior Art FIG. 2, in a precision landing system, directional signal 32 is commonly transmitted at an elevation angle of 3 degrees from the end of a runway 34. The path of directional signal 32 is referred to as the glideslope. In a precision landing the pilot follows the glideslope path towards the end of the runway. As aircraft 36 approaches the runway 34, the pilot flies aircraft 36 along the glideslope path until aircraft 36 reaches a specified altitude 38 referred to as the decision height. Once aircraft 36 reaches decision height 38, the pilot attempts to visually ascertain a runway reference such as the runway itself, runway lights, runway threshold, and the like. If the pilot visually ascertains a runway reference when at decision height 38 the pilot lands aircraft 36. If the pilot does not visually ascertain a runway reference at decision height 38, landing of aircraft 36 is aborted. Thus, unlike a non-precision landing system, a precision landing system provides both horizontal and vertical guidance to the pilot.

Prior Art FIG. 3A, shows a gauge 40 used by a pilot during a precision landing. Gauge 40 indicates the aircraft's position with respect to beam 32 of Prior Art FIG. 2. Specifically, vertically-arranged indicator bar 42 and horizontally-arranged indicator bar 44 indicate the aircraft's position with respect to the center of beam 32. When using gauge 40, the pilot attempts to keep both vertically-arranged indicator bar 42 and horizontally-arranged indicator bar 44 centered as shown in Prior Art FIG. 3A. If the aircraft moves to the right of beam 32, vertically-arranged indicator bar 42 moves to the left as shown in FIG. 3B. To move vertically-arranged indicator bar 42 back towards the center, the pilot must move the aircraft to the left. Likewise, if the aircraft moves to the left of beam 32, vertically-arranged indicator bar 42 moves to the right, as shown in FIG. 3C and the pilot must move the aircraft to the right to center vertically-arranged indicator bar 42. Such a technique is referred to as "flying towards the needle." In so doing, the pilot is able to keep the aircraft horizontally centered with respect to beam 32.

The vertical position of the aircraft with respect to beam 32 is also indicated on gauge 40. That is, if the altitude of the aircraft becomes lower than the altitude of beam 32, horizontally-arranged indicator bar 44 rises, as shown in FIG. 3D. To lower horizontally-arranged indicator bar 44 back towards the center, the pilot must increase the altitude of the aircraft. Likewise, if the altitude of the aircraft becomes higher than the altitude of beam 32, horizontally-arranged indicator bar 44 lowers, as shown in FIG. 3E, and the pilot must decrease the altitude of the aircraft to center horizontally-arranged indicator bar 44. Again, such a technique is referred to as "flying towards the needle." In so doing, the pilot is able to keep the aircraft vertically centered with respect to beam 32. Thus, a precision landing system provides the pilot with both vertical and horizontal guidance. Although precision landing systems provide a greater degree of guidance for pilots, precision landing are not available at all landing sites. Furthermore, precision landing systems require the construction of a substantial ground based infrastructure at each landing site to provide the required signal transmissions. As an additional drawback, the installation of a precision landing system is often prohibitively expensive for many landing site owners.

Some prior art landing systems, such as those worked on by Clark Cohen at Stanford University, are attempting to achieve fully automated pilotless landings. However, like other prior art landing systems, pilotless landing systems require the construction of a substantial ground based infrastructure at each landing site to provide the required signal transmissions.

Thus, a need exists for a precision equivalent landing system which is universally applicable, a precision equivalent landing system which does not require the construction of a substantial ground-based infrastructure at each potential landing site, and a precision equivalent landing system which is affordable.

DISCLOSURE OF THE INVENTION

It is therefore an object of the present invention to provide a precision equivalent landing system which is universally applicable, a precision equivalent landing system which does not require the construction of a substantial ground-based infrastructure at each potential landing site, and a precision equivalent landing system which is affordable. The above object has been achieved by an aircraft landing system having a ILS-type graphic readout driven by conventional uncorrected GPS and an altimeter.

In the present invention, a precision equivalent landing system is disclosed. In one embodiment, a position determining system is coupled to an aircraft. The position determining system generates lateral position information of the aircraft with respect to a landing approach path. An altimeter is also coupled to the aircraft. The altimeter generates vertical position information for the aircraft. A graphic display disposed within the aircraft concurrently displays a visual representation of the lateral position of the aircraft with respect to the landing approach path and the vertical position of the aircraft. In so doing, the present invention provides both relative position and altitude of an incoming aircraft with respect to a landing approach path. Thus, the present invention provides a precision equivalent landing system without requiring the equipment and expense associated with ILS or FAA MLS precision landing systems.

In one embodiment, the position determining system is a satellite-based radio navigation system such as, for example, the Global Positioning System, the Global Orbiting Navigation System, and the like.

In one embodiment of the present invention, the vertical position of the aircraft is a generated using a baro-altimeter.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 3A–3E are front views of a Prior Art gauge used by a pilot during a precision landing.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
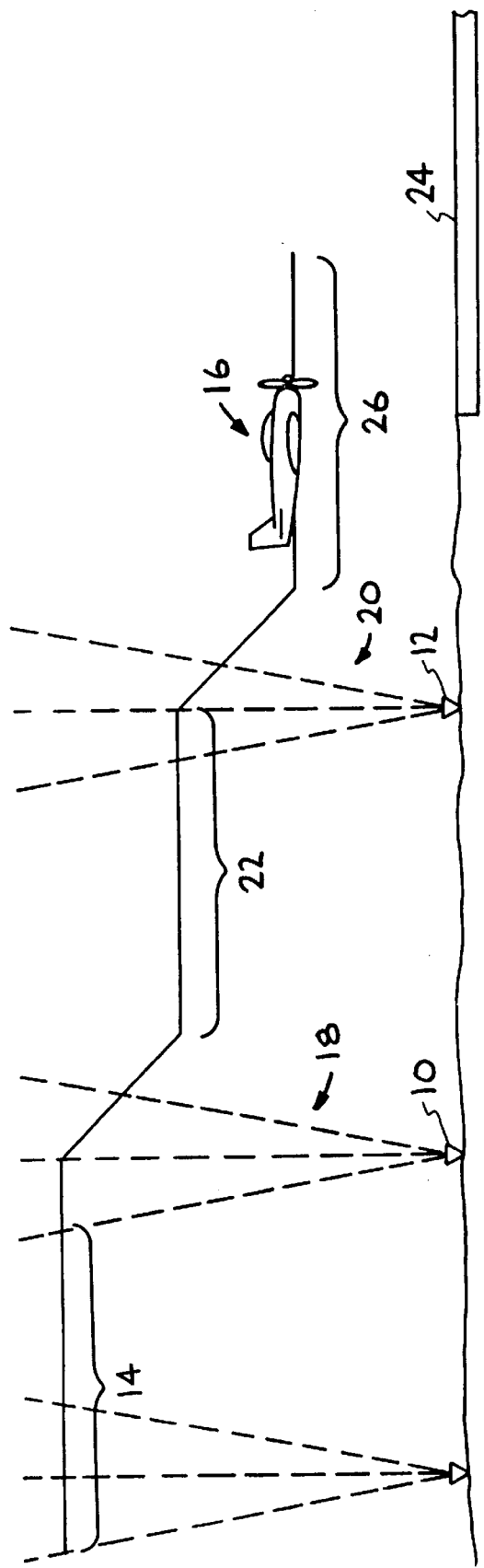
FIG. 1 is a Prior Art schematic diagram of an aircraft attempting a non-precision landing approach.
Figure 2:
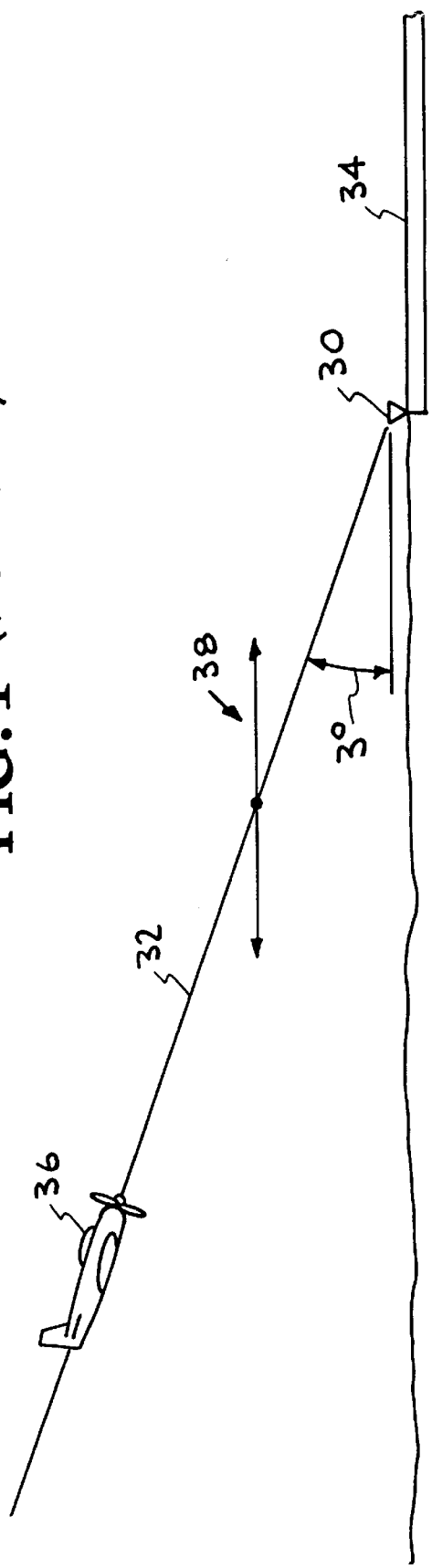
FIG. 2 is a Prior Art schematic diagram of an aircraft attempting a precision landing approach.
Figure 3D:
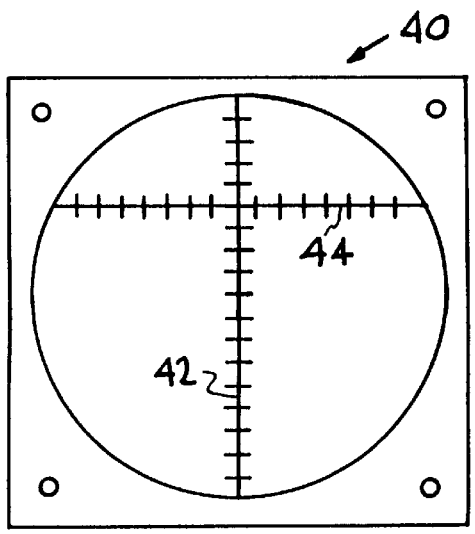
Figure 3E:
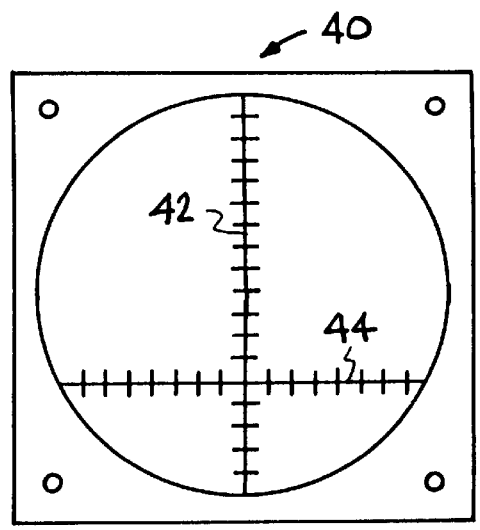
Figure 4:
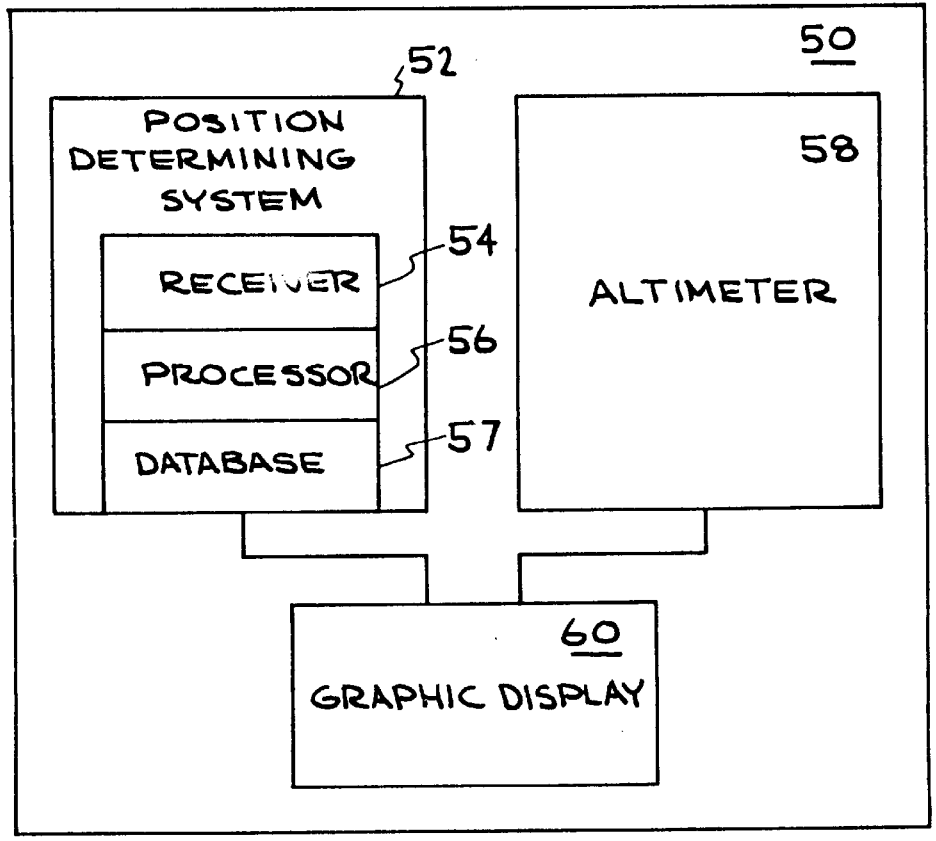
FIG. 4 is a schematic diagram of a precision equivalent landing system in accordance with the present claimed invention.

With reference now to FIG. 4, a schematic diagram of one embodiment of a precision equivalent landing system in accordance with the present claimed invention is shown. As shown in FIG. 4, the present precision equivalent landing system includes a position determining system 52 having a receiver 54 and a processor 56 integral therewith. Receiver 54 receives position information signals and transfers the position information signals to processor 56. Processor 56 then generates position information indicative of the location of the aircraft. Position determining system 52 generates position information indicating, for example, the latitude, longitude, altitude, and velocity of an aircraft. Position determining system 52 also accurately determines the time at which the aircraft is at a specific location. In the present embodiment, however, position determining system 52 is used to generate lateral or horizontal position information. That is, position determining system 52 is used to accurately determine the latitude and longitude of the aircraft in which the present invention is employed. It will be understood by those of ordinary skill in the art that numerous other well known features are not shown for purposes of clarity. Such well known features include but are not limited to, processing logic, user controls, power circuitry, and the like. In the present invention, position determining system 52 is, for example, a satellite-based radio navigation system. Satellite-based radio navigation systems such as the Global Positioning System (GPS), the Global Orbiting Navigational System (GLONASS), and the like are well suited for use with the present invention. Although such systems are specifically mentioned in the present embodiment, the present invention is also well suited to land-based radio navigation systems such as, for example, LORAN and the like. Additionally, the present invention is also well suited to recording GPS ephemeris data.

With reference still to FIG. 4, the present invention further includes an altimeter 58 for determining the altitude of the aircraft on which the present invention is used. In the present embodiment, altimeter 58 is a baro-altimeter which determines altitude based upon barometric pressure. Although such an altimeter is used in the present embodiment, the present invention is also well suited to the use of other altitude sensing devices. As shown in FIG. 4, both position determining system 52 and altimeter 58 are communicatively coupled to a graphic display 60. In the present embodiment, graphic display 60 is a gauge similar to the gauge used by a pilot during a precision landing. That is, the gauge used in the present embodiment includes a horizontally-arranged indicator bar and a vertically-arranged indicator bar which indicate the aircraft's position with respect to a desired landing approach path. A detailed description of the integration of an altimeter and a GPS is found in commonly owned currently pending U.S. patent application Ser. No. 08/414,443 to McBurney et al. filed Mar. 31, 1995, entitled "Use of an Altitude Sensor to Augment Availability of GPS Location Fixes" which is incorporated herein by reference.

To use the present invention, as the pilot nears the desired landing site, the pilot selects a landing approach path using user controls, not shown in FIG. 4. The landing approach path includes such information as the latitude, longitude, and elevation of the landing site, the direction or heading from which the aircraft will approach the landing site, and the touchdown point for the aircraft. In the present embodiment, the present precision equivalent landing system includes a database 57 having at least one landing approach path for a selected airport stored therein. The present invention is also well suited to having the airport transmit at least one landing approach path to an approaching aircraft. The present invention is further well suited to having the airport instruct the pilot which of numerous landing approach paths stored in database 57 for that specific airport is to be used at that time. In yet another embodiment, possible landing approach paths are stored on, for example, portable database memory cards. Such an embodiment has the advantage of allowing a pilot to purchase or otherwise obtain frequently updated landing approach paths for selected airports.

In the present embodiment, database 57 includes information regarding the crossing altitudes for particular waypoints along the landing approach. The present precision landing system calculates the desired altitude for the aircraft as a function of the aircraft's distance from the particular waypoints. The difference between the computed desired altitude and the actual altitude determined by the altimeter is used to drive a glide slope needle on display 60. Therefore, as the pilot descends towards the landing site, display 60 indicates both the aircraft's horizontal and vertical position with respect to the selected landing approach path. Thus, the present invention provides both lateral and vertical landing guidance to the pilot without requiring that the landing site be equipped with an ILS, FAA MLS, or other type of precision landing system.

Figure 5:
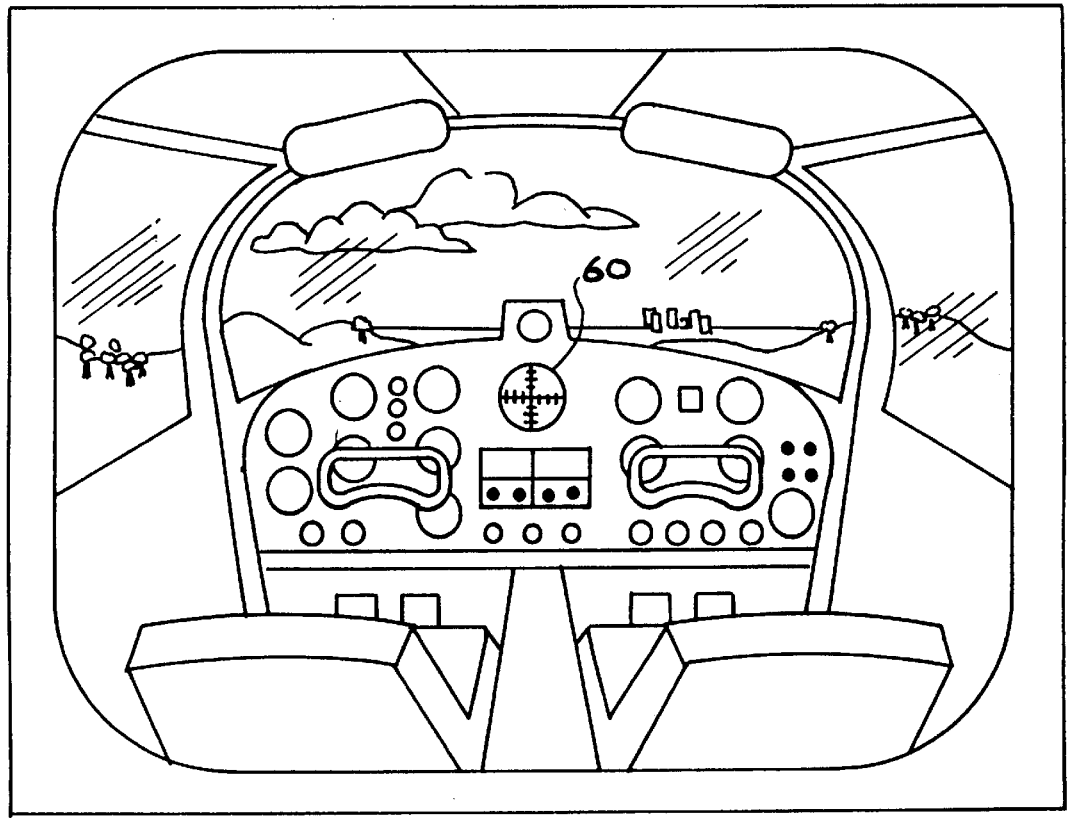
FIG. 5 is a perspective view of the interior of an aircraft equipped with a precision equivalent landing system in accordance with the present claimed invention.

With reference next to FIG. 5, a perspective view of the interior of an aircraft equipped with the present precision equivalent landing system is shown. In FIG. 5, gauge 60 comprises the graphic display portion of the present invention. The size of gauge 60 is exaggerated for purposes of clarity. User controls located in the cockpit are used to enter or select a landing approach path. The present invention is also well suited to locating gauge 60 at other locations within the cockpit of the aircraft.

With reference next to a FIG. 6, a detailed schematic view of gauge 60 of the present invention is shown. In the present embodiment, gauge 60 includes a vertically-arranged indicator bar 62 and a horizontally-arranged indicator bar 64. Vertically-arranged indicator bar 62 and horizontally-arranged indicator bar 64 concurrently represent the aircraft's position with respect to previously selected landing approach path. As in an ILS or FAA MLS precision landing system, the pilot attempts to keep both vertically-arranged indicator bar 62 and horizontally-arranged indicator bar 64 centered as shown in FIG. 6A. In the present invention, position determining system 52 of FIG. 4 is used to drive vertically-arranged indicator bar 62. That is, the present invention compares the latitude and longitude of the aircraft, as determined by position determining system 52, with the previously selected landing approach path. Thus, if the aircraft moves to the right of the landing approach path, vertically-arranged indicator bar 62 moves to the left as shown in FIG. 6B. To move vertically-arranged indicator bar 62 back towards center, the pilot must move the aircraft to the left. Likewise, if the aircraft moves to the left of the landing approach path, vertically-arranged indicator bar 62 moves to the right as shown in FIG. 6C, and the pilot must move the aircraft to the right to center vertically-arranged indicator bar 62. In so doing, the present invention allows the pilot is able to keep the aircraft horizontally centered with respect to the selected landing approach path.

Figure 6A:
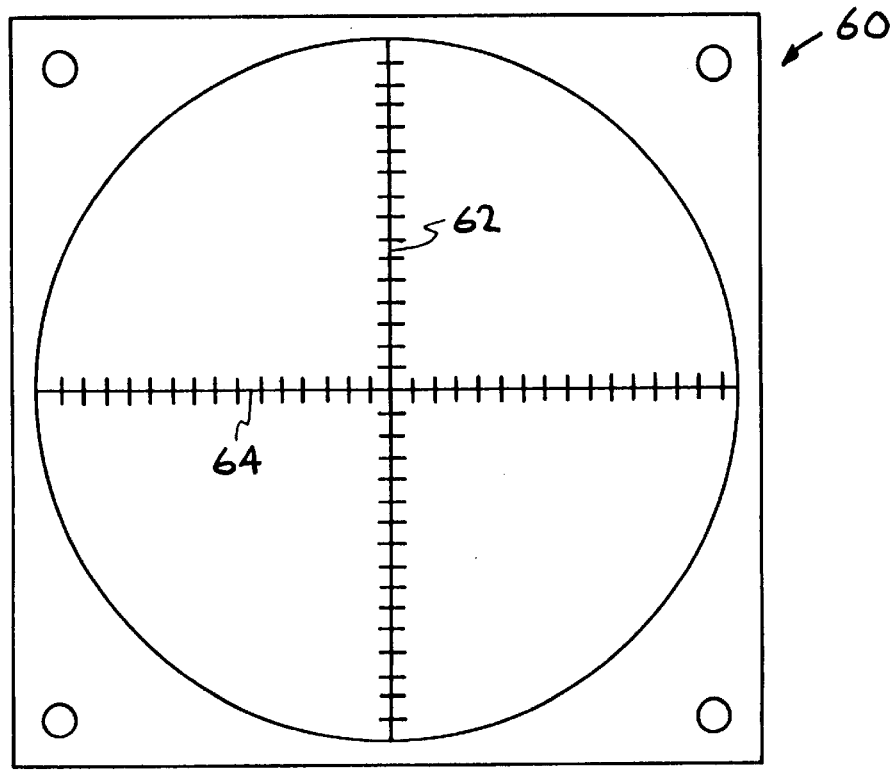
FIGS. 6A–6E are front views of a precision equivalent landing system gauge in accordance with the present claimed invention.
Figure 6B:
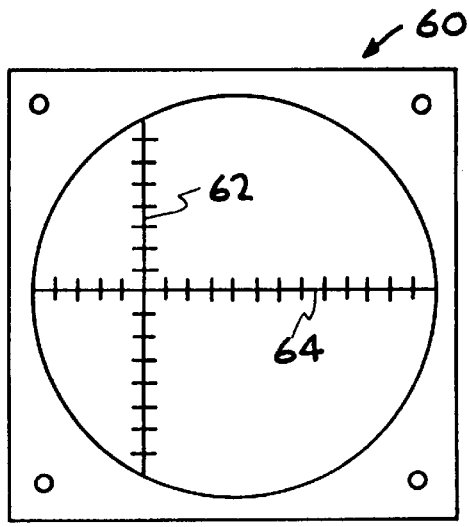
Figure 6C:
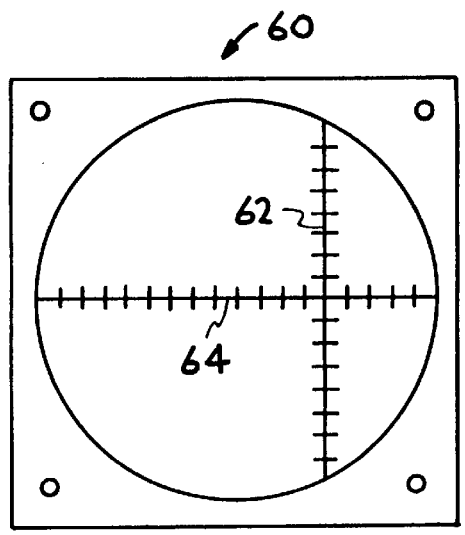
Figure 6D:
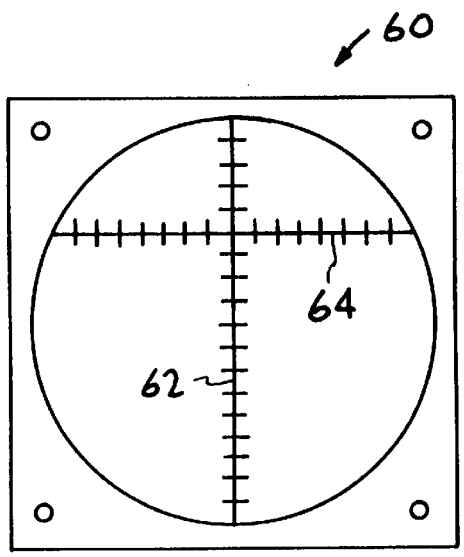
Figure 6E:
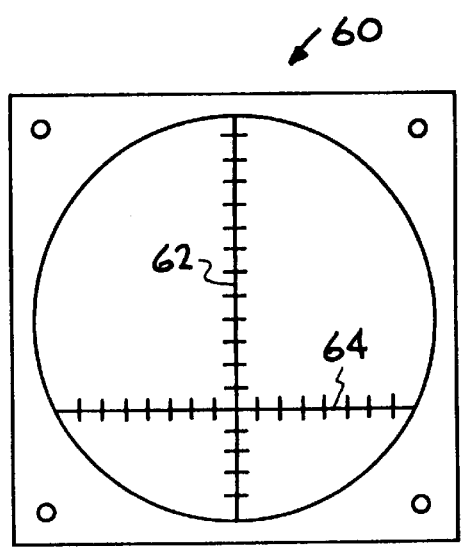

The vertical position of the aircraft with respect to a computed desired altitude is also shown by gauge 60. In the present invention, altimeter 58 of FIG. 4 is used to drive horizontally-arranged indicator bar 64. That is, the present invention compares the altitude of the aircraft, as determined by altimeter 58, with the computed desired altitude. Thus, if the altitude of the aircraft becomes lower than the altitude should be according to the landing approach path, horizontally-arranged indicator bar 64 rises as shown in FIG. 6D. To lower horizontally-arranged indicator bar 64 back towards the center, the pilot must increase the altitude of the aircraft. Likewise, if the altitude of the aircraft becomes higher than the altitude should be, horizontally-arranged indicator bar 64 lowers as shown in FIG. 6E, and the pilot must then decrease the altitude of the aircraft to center horizontally-arranged indicator bar 64. In so doing, the pilot is able to keep the altitude of the aircraft approximately equal to the computed desired altitude along the landing approach path. Thus, the present invention provides a precision-equivalent landing system which concurrently provides the pilot with both vertical and horizontal guidance to a selected landing approach path. Furthermore, the present invention provides position information in a manner, i.e. gauge 60, which is familiar to pilots.

In the present embodiment, position determining system 52 determines the latitude and longitude of the aircraft to within approximately 100 meters even when subjected to selected availability (SA) induced error. However, such error does not substantially affect the usefulness of the present precision-equivalent landing system. That is, as the pilot reaches the decision height during, for example, a category 1 landing, the pilot will still have ample time to alter the position of the aircraft to correct for SA induced error. Thus, the present invention maintains its utility even without differential corrections. However, the present precision-equivalent landing system is also well suited for use at landing sites equipped with a differential corrections transmitter. In such an instance, position determining system 52 will determine the latitude and longitude of the aircraft to within approximately 3 meters. The present invention is also well suited to being used in conjunction with improved position determining accuracy provided by the impending WAAS system. Likewise, any vertical position inaccuracy in the baro-altimeter of the present invention does not substantially affect the usefulness of the present precision-equivalent landing system. That is, as the pilot reaches the decision height, a slight difference in actual and reported altitude will not affect the pilot's ability to land or abort the landing of the aircraft.

Furthermore, although a gauge 60 is recited in the present embodiment, the present invention is also well suited to other types of graphic displays such as, for example, a digital readout, a synthesized voice display, indicator dials, and the like.

Thus, the present precision-equivalent landing system can be used at any potential landing site. The present precision-equivalent landing system does not require the construction of a substantial ground-based infrastructure at each potential landing site. As an additional benefit, the present precision-equivalent landing system can be employed in an aircraft at a cost substantially less than the cost associated with constructing an ILS or FAA MLS precision landing system.

In another embodiment, the present invention operates in conjunction with well known and widely used commercial flight computers to guide the pilot to the nearest landing site during an emergency. In such an embodiment, the present invention would provide both relative position and altitude of the distressed incoming aircraft with respect to a landing approach path to the nearest landing site. In the present embodiment, the pilot activates the emergency landing mode by pushing a single button on the flight computer. Once the button is activated, the flight computer will guide the pilot to the nearest landing strip.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A precision equivalent landing system comprising:

a position determining system adapted to be coupled to an aircraft, said position determining system generating lateral position information of said aircraft with respect to a landing approach path;

an altimeter adapted to be coupled to said aircraft, said altimeter adapted to generate vertical position information of said aircraft with respect to said landing approach path, said altimeter adapted to provide said vertical position information without receiving second vertical position information from said position determining system; and a graphic display adapted to be disposed within said aircraft for concurrently displaying a visual representation of said lateral position of said aircraft with respect to said landing approach path and said vertical position of said aircraft with respect to said landing approach path, wherein said precision equivalent landing system provides said visual representation of said lateral position of said aircraft with respect to said landing approach path and said vertical position of said aircraft with respect to said landing approach path without requiring ground-based infrastructure at or near said landing approach path.

2. The precision equivalent landing system of claim 1 wherein said position determining system is a satellite-based radio navigation system.

3. The precision equivalent landing system of claim 2 wherein said satellite-based radio navigation system consists of the Global Positioning System.

4. The precision equivalent landing system of claim 2 wherein said satellite-based radio navigation system consists of the Global Orbiting Navigation System.

5. The precision equivalent landing system of claim 1 wherein said position determining system further includes:

a signal receiver; and a signal processor having an input coupled to said signal receiver, said signal processor generating said lateral position information of said aircraft with respect to said landing approach path from signals received at said input from said signal receiver, said signal processor having an output coupled to said graphic display, said output providing said lateral position information of said aircraft with respect to said landing approach path from said signal processor to said graphic display.

6. The precision equivalent landing system of claim 1 wherein said altimeter is comprised of a baro-altimeter.

7. A precision equivalent aircraft landing method comprising the steps of:

generating lateral position information of an aircraft with respect to a landing approach path, said lateral position information determined by a position determining system coupled to said aircraft;

generating vertical position information of said aircraft with respect to said landing approach path, said vertical position information generated by an altimeter coupled to said aircraft, said altimeter adapted to provide said vertical position information of without receiving second vertical position information from said position determining system; and concurrently displaying, on a graphic display disposed within said aircraft, a visual representation of said lateral position of said aircraft with respect to said landing approach path and said vertical position of said aircraft with respect to said landing approach path, wherein said precision equivalent aircraft landing method provides said visual representation of said lateral position of said aircraft with respect to said landing approach path and said vertical position of said aircraft with respect to said landing approach path without requiring ground-based infrastructure at or near said landing approach path.

8. The precision equivalent aircraft landing method as recited in claim 7 wherein said step of generating lateral position information of said aircraft further includes generating said lateral position information of said aircraft using a satellite-based radio navigation position determining system.

9. The precision equivalent aircraft landing method as recited in claim 8 wherein said step of generating lateral position information of said aircraft using a satellite-based radio navigation position determining system further includes the step of generating said lateral position information of said aircraft using the Global Positioning System.

10. The precision equivalent aircraft landing method as recited in claim 8 wherein said step of generating lateral position information of said aircraft with respect to said landing approach path using a satellite-based radio navigation position determining system further includes the step of generating said lateral position information of said aircraft using the Global Orbiting Navigation System.

11. The precision equivalent aircraft landing method as recited in claim 7 wherein said step of generating lateral position information of said aircraft with respect to said landing approach path further includes the steps of:

receiving radio navigation signals at a signal receiver of said position determining system, processing said radio navigation signals using a signal processor of said position determining system to generate said lateral position information of said aircraft with respect to said landing site, said radio navigation signals received from said signal receiver at an input of said signal processor; and providing said lateral position information of said aircraft with respect to said landing approach path to said graphic display via an output of said signal processor.

12. The precision equivalent aircraft landing method as recited in claim 7 wherein said step of generating vertical position information of said aircraft with respect to said landing approach path further includes the step of:

generating vertical position information of said aircraft with respect to said landing approach path using a baro-altimeter.

13. An ILS equivalent aircraft landing apparatus comprising:

a satellite-based position determining system adapted to be coupled to an aircraft, said satellite position determining system adapted to generate lateral position information of said aircraft with respect to a landing approach path;

an altimeter adapted to be coupled to said aircraft, said altimeter adapted to generate vertical position information of said aircraft with respect to said landing approach path, said altimeter adapted to provide said vertical position information without receiving second vertical position information from said position determining system; and a graphic display for concurrently displaying a visual representation of said lateral position of said aircraft with respect to said landing approach path and said vertical position of said aircraft with respect to said landing approach path, wherein said ILS equivalent aircraft landing apparatus provides said visual representation of said lateral position of said aircraft with respect to said landing approach path and said vertical position of said aircraft with respect to said landing approach path without requiring ground-based infrastructure at or near said landing approach path.

14. The ILS equivalent aircraft landing apparatus of claim 13 wherein said satellite-based position determining system consists of the Global Positioning System.

15. The ILS equivalent aircraft landing apparatus of claim 13 wherein said satellite-based position determining system consists of the Global Orbiting Navigation System.

16. The ILS equivalent aircraft landing apparatus of claim 13 wherein said satellite-based position determining system further includes:

a signal receiver; and a signal processor having an input coupled to said signal receiver, said signal processor generating said lateral position information of said aircraft with respect to said landing approach path from signals received at said input from said signal receiver, said signal processor having an output coupled to said graphic display, said output providing said lateral position information of said aircraft with respect to said landing approach path from said signal processor to said graphic display.

17. The ILS equivalent aircraft landing apparatus of claim 13 wherein said altimeter is comprised of a baro-altimeter.

* * * * *